United States Patent
Liu et al.

(10) Patent No.: US 11,234,318 B2
(45) Date of Patent: Jan. 25, 2022

(54) SLAVE INTERFACE FOR A DALI NETWORK

(71) Applicant: DIALOG SEMICONDUCTOR INC., Campbell, CA (US)

(72) Inventors: Wenduo Liu, Campbell, CA (US); Kun Yang, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 42 days.

(21) Appl. No.: 16/880,721

(22) Filed: May 21, 2020

(65) Prior Publication Data

US 2020/0375008 A1 Nov. 26, 2020

Related U.S. Application Data

(60) Provisional application No. 62/851,594, filed on May 22, 2019.

(51) Int. Cl.
| | |
|---|---|
| *H05B 47/18* | (2020.01) |
| *H05B 45/37* | (2020.01) |
| *H05B 45/395* | (2020.01) |
| *H04L 29/08* | (2006.01) |

(52) U.S. Cl.
CPC ............. *H05B 47/18* (2020.01); *H04L 67/12* (2013.01); *H05B 45/37* (2020.01); *H05B 45/395* (2020.01)

(58) Field of Classification Search
CPC ....... H04L 67/12; H05B 45/37; H05B 45/395; H05B 47/18
See application file for complete search history.

(56) References Cited

U.S. PATENT DOCUMENTS

| | | | |
|---|---|---|---|
| 2012/0286770 A1 | 11/2012 | Schroder et al. | |
| 2014/0139113 A1 | 5/2014 | Kim et al. | |
| 2015/0076994 A1* | 3/2015 | Rezeanu | H03K 17/00 315/155 |
| 2015/0084547 A1 | 3/2015 | Yeh et al. | |
| 2015/0223306 A1* | 8/2015 | Rezeanu | H04L 25/0274 315/200 R |
| 2016/0174340 A1* | 6/2016 | Rezeanu | H04B 3/50 315/200 R |
| 2017/0055331 A1* | 2/2017 | Rezeanu | H04L 25/0266 |
| 2017/0181240 A1* | 6/2017 | Daranyi | H05B 45/50 |

FOREIGN PATENT DOCUMENTS

| | | |
|---|---|---|
| EP | 2792216 A4 | 8/2016 |
| EP | 3240370 A1 | 11/2017 |
| EP | 3258647 A1 | 12/2017 |
| EP | 1825720 B1 | 2/2018 |
| EP | 3484249 A1 | 5/2019 |
| EP | 3523865 A2 | 8/2019 |

* cited by examiner

*Primary Examiner* — Kurtis R Bahr
(74) *Attorney, Agent, or Firm* — Haynes & Boone, LLP

(57) ABSTRACT

A DALI interface is provided that includes a digital isolator having an input terminal and an output terminal. A DALI bus controlled by a master device controls a binary voltage state of a voltage rail. A DFET couples between the input terminal and the output terminal to control a voltage of the input terminal responsive to the control of the DALI bus by the master device. The digital isolator responds to the control of the input terminal voltage to drive a digital signal through an isolation barrier to control a voltage of the output terminal to control a slave lighting device.

20 Claims, 3 Drawing Sheets

SLAVE INTERFACE FOR A DALI NETWORK

CROSS-REFERENCE TO RELATED APPLICATIONS

This application claims priority to and the benefit of U.S. Provisional Patent Application No. 62/851,594 filed May 22, 2019 and entitled "SLAVE INTERFACE FOR A DALI NETWORK", which is hereby incorporated by reference in its entirety.

TECHNICAL FIELD

This application relates to digital addressable lighting interface (DALI) networks, and more particularly to a slave interface for a DALI network.

BACKGROUND

Of the various control architectures that have been developed for lighting applications, the digital addressable lighting interface (DALI) has emerged as a de-facto standard for the digital control of a lighting network. In a DALI system, a DALI master controls various DALI slave devices such as ballasts and LED drivers through a two-wire DALI bus. Each slave device couples to the DALI bus through a slave interface. DALI networks are quite advantageous as the communication between the master and its slaves is bi-directional. The master can thus not only control the various slaves through master-to-slave directed messages but can also be informed of faults or other operating states via messages from the slaves via slave-to-master directed messages.

The slave interface galvanically isolates the slave device from the DALI bus. It is conventional to implement this galvanic isolation through a pair of optocouplers. The slave interface drives messages from the master to the slave device through one of the optocouplers. Messages from the slave device to the master are received at the slave interface through the remaining optocoupler. But optocouplers are inherently slow analog devices. In addition, optocouplers consume substantial power. Moreover, the slave interface is typically composed of discrete devices that increase manufacturing cost and build complexity.

Accordingly, there is a need in the art for an improved DALI interface for slave devices.

SUMMARY

In accordance with a first aspect of the disclosure, a DALI circuit is provided that includes: a diode bridge configured to couple an interface to a voltage rail, wherein the interface is selected from the group consisting of a DALI bus and an AC mains; a depletion-mode FET (DFET) having a drain coupled to the voltage rail; a first Zener diode coupled between the voltage rail and ground, wherein a first terminal of the first Zener diode is also connected to a gate of the DFET; and a digital isolator configured to couple a source of the DFET across a galvanic isolation barrier to an output terminal.

In accordance with a second aspect of the disclosure, a method of DALI signaling is provided that includes: responsive to a binary transition for a voltage state of a DALI bus, switching a depletion-mode FET (DFET) to produce a binary transition in a first terminal voltage; transmitting a digital signal across a galvanic isolation barrier in a digital isolator responsive to the binary transition in the first terminal voltage to produce a binary transition in a second terminal voltage; and controlling an LED responsive to the binary transition of the second terminal voltage.

In accordance with a second aspect of the disclosure, a DALI system is provided that includes: a DALI bus; a DALI master configured to drive the DALI bus; a voltage rail; a diode bridge configured to rectify a voltage of the DALI bus to produce a rail voltage on the voltage rail; a digital isolator having an input terminal and an output terminal; a DFET coupled between the voltage rail and the input terminal; and a slave lighting device connected to the output terminal.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

To avoid the bandwidth limitations and power consumption of optocouplers, a DALI slave interface is disclosed that couples the master-to-slave and slave-to-master communications though a digital isolator. The resulting DALI interface advantageously uses relatively few discrete components so that manufacturing costs are reduced by the integration of the DALI interface. Moreover, the DALI interface is not limited to communications over a two-wire DALI bus but is also compatible with AC line control messaging. The input bus to the DALI interface may thus be a DALI bus or an AC mains.

Figure 1:
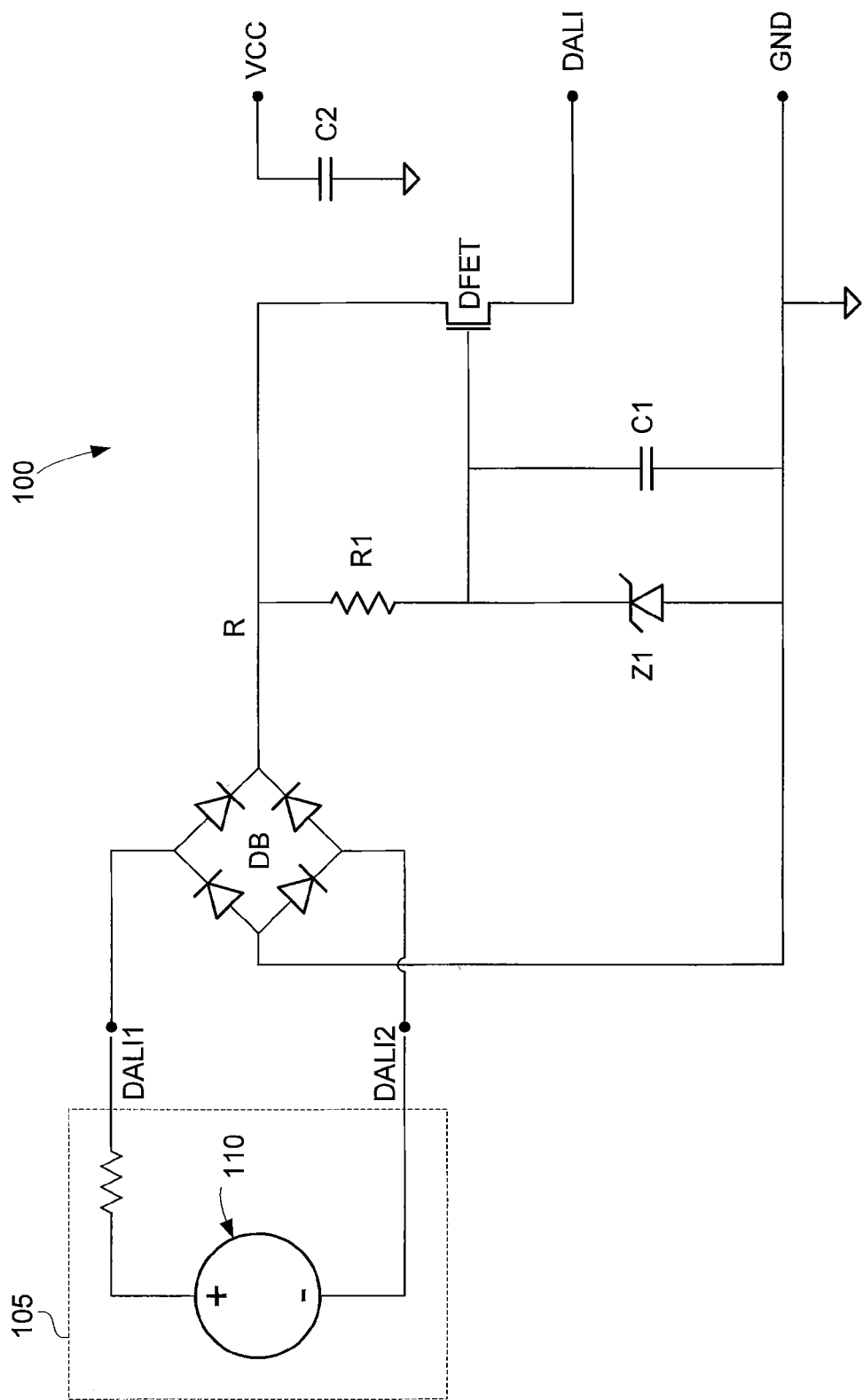
FIG. 1 is a circuit diagram of a discrete (circuit board) portion of a DALI/AC interface in accordance with an aspect of the disclosure.

Turning now to the drawings, a discrete portion 100 of a DALI interface is shown in FIG. 1. As implied by the designation of "discrete", discrete portion 100 may be implemented using components integrated through a circuit board. In other embodiments, one or more components of discrete portion 100 may be implemented in an integrated circuit. A DALI master 110 drives a positive wire DALI1 and a negative wire DALI2 of the DALI bus 105. Alternatively, the positive wire DALI and negative wire DALI2 may represent an AC mains receiving AC mains signals from an AC source 110. The following discussion will assume that DALI signaling is used but it will be appreciated that the signaling may occur over an AC mains. Depending upon the mode, a high-voltage state for DALI1 may range from 9.5 to 22.5 V, with a typical value of approximately 16 V. This high-level condition represents a logic high state and is also used during a DALI idle state. A low-voltage state (logic low) may also vary from −6.5 to 6.5 V in some embodiments.

DALI bus 105 drives a diode bridge (DB) to produce a rail voltage on a rail (R) at the drain of a depletion-mode NMOS transistor (DFET). The rail R couples through a resistor R1 to drive the gate of the DFET. In contrast to an enhancement-mode NMOS transistor, the DFET is in an on-state when its gate-to-source voltage is zero. As the gate-to-source voltage for the DFET becomes more and more negative, the DFET will switch off. To control the gate voltage for the DFET, the resistor R1 couples to ground through a Zener diode Z1 and a capacitor C1 in parallel with the Zener diode Z1. The breakdown voltage of the Zener diode Z1 thus determines the gate voltage for the DFET. The capacitor C1 stores this gate voltage/breakdown voltage. For example, suppose that the breakdown voltage of Zener diode Z1 is approximately nine volts. During the high-voltage state for DALI bus 105, the rail voltage on rail R will be driven high such as to 22 V. The Zener diode Z1 then breaks down to keep the gate voltage for the DFET clamped to 9 V. Suppose that a DFET threshold voltage for the DFET is −2 V. The DFET will thus switch off whenever the rail voltage on rail R rises above approximately 11 V. More generally, the DFET will switch off when the rail voltage rises an absolute value of the DFET threshold voltage greater than the breakdown voltage of Zener diode Z1. During the low-voltage state for DALI bus 105, the rail voltage will be less than a sum of the breakdown voltage of Zener diode and the absolute value of the DFET threshold voltage, which switches on the DFET.

Figure 2:
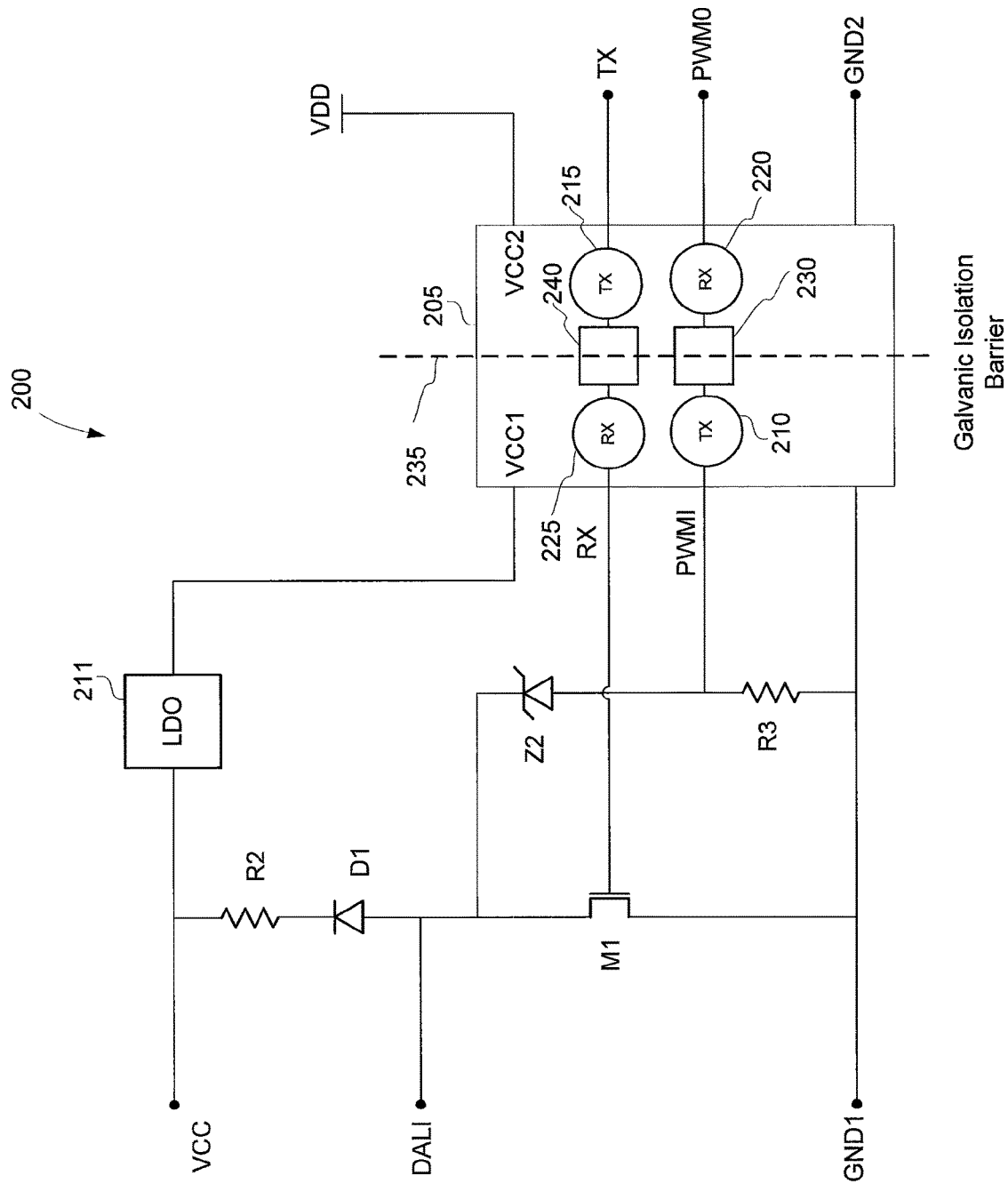
FIG. 2 is a circuit diagram of an integrated circuit portion of a DALI/AC interface in accordance with an aspect of the disclosure.

The source for the DFET couples to a DALI terminal for an integrated circuit portion 200 of the DALI interface shown in FIG. 2. Referring again to FIG. 1, discrete portion 100 includes a power supply capacitor VCC that supplies a VCC power supply voltage to a VCC terminal of integrated circuit portion 200. The DALI terminal for integrated circuit portion 200 couples to a drain of an NMOS enhancement-mode transistor M1 that has a source coupled to a ground terminal GND1. In addition, the DALI terminal couples to ground terminal GND1 through a serial combination of a Zener diode Z2 and a resistor R3. Zener diode Z2 reduces the DALI terminal voltage by its breakdown voltage. The PWMI terminal also couples to ground through resistor R3.

When the DFET is switched off, the DALI terminal is clamped at 11 V if Zener diode Z1 has a breakdown voltage of 9 V and the DFET threshold voltage is −2 V. More generally, the DALI terminal is clamped at the breakdown voltage of Zener diode Z1 minus the threshold voltage of the DFET (the sum of the absolute value of the DFET threshold voltage and the breakdown voltage of Zener diode Z1). Suppose the breakdown voltage of Zener diode Z2 is 5.5 V. The PWMI terminal is thus driven to 6.5V in the example embodiment discussed herein during the high state for DALI bus 105 while the DFET does not conduct. More generally, the PWMI terminal is driven to the breakdown voltage of Zener diode Z1 minus the threshold voltage of the DFET and minus the breakdown voltage of Zener diode Z2 while the DFET does not conduct.

During the low-voltage state for DALI bus 105, the DFET switches on. The DALI terminal voltage will thus fall as the voltage of DALI bus 105 falls. For example, suppose the DALI terminal voltage drops to 6.5 V. The PWMI terminal voltage then drops to 6.5 V minus the breakdown voltage for Zener diode Z2. If this breakdown voltage is 5.5 V, the low state for PWMI is thus around 0.5 V. The PWMI terminal voltage is thus a digital signal that varies from a high state (e.g., 6.5 V) in response to the high-voltage state of DALI bus 105 to a low state (e.g., 0.5 V) in response to the low-voltage state of DALI bus 105. With regard to this PWMI digital signal, note that integrated circuit portion 200 has no control over the slew rate of DALI bus 105. This uncontrolled slew rate affects the transmission of the PWMI digital signal to a slave device across a galvanic isolation boundary. For example, suppose that one used a capacitor as a passive device to provides a galvanic isolation barrier. The PWMI terminal could thus drive one terminal of a capacitor that would provide an output PWM (PWMO) voltage at its other terminal. But given the relatively-slow slew rate for the PWMI digital signal, such a passive solution would require a relatively-large capacitor.

To respond to the relatively-slow slew rate for the PWMI digital signal, the PWMI terminal is a terminal of a digital isolator 205. As known in the digital isolator arts, digital isolator 205 uses either a capacitive or magnetic coupling to transmit digital signals through a galvanic isolation barrier 235 using an isolation component 230. Isolation component 230 may be constructed using one or more capacitors in a capacitively-coupled embodiment for digital isolator 205. Alternatively, isolation component may comprise one or more transformers in a magnetically-coupled embodiment for digital isolator 205. But as discussed previously, to merely passively drive a capacitor with a digital signal having a relatively-slow slew rate would require a relatively-large capacitance. In addition, such passive transmission would be vulnerable to noise on the PWMI terminal voltage. To filter noise and allow isolation component 230 to have a relatively-small capacitance, digital isolator 205 actively drives isolation component 230 with a signal from a signal generator 210. In one embodiment, signal generator 210 may be an oscillator that drives an oscillating signal into a terminal of capacitor in response to a detection of a corresponding binary state for the PWMI terminal voltage. This signal transmission may be single-ended or differential. For example, the oscillator may drive isolating component 230 with an oscillating signal in response to a detection that the PWMI terminal voltage has dropped to the low state. In response to the PWMI terminal voltage being in the high state, the oscillator would not drive isolation component 230 or could change its oscillating frequency. Alternatively, signal generator 210 may be a pulse generator that provides a sufficient slew rate to the rising (or falling) edge of a pulse in response to a detection that the PWMI terminal voltage had changed states. Regardless of whether it functions as an oscillator or pulse generator, signal generator 210 is an active device so it is powered by a power supply voltage VCC1 received on a VCC1 terminal and uses a ground supplied through a first ground (GND1) terminal. A receiver 220 demodulates the signal transmitted across isolation component 230 to recover a digital signal that is driven to the slave device through an output terminal PWMO.

Figure 3:
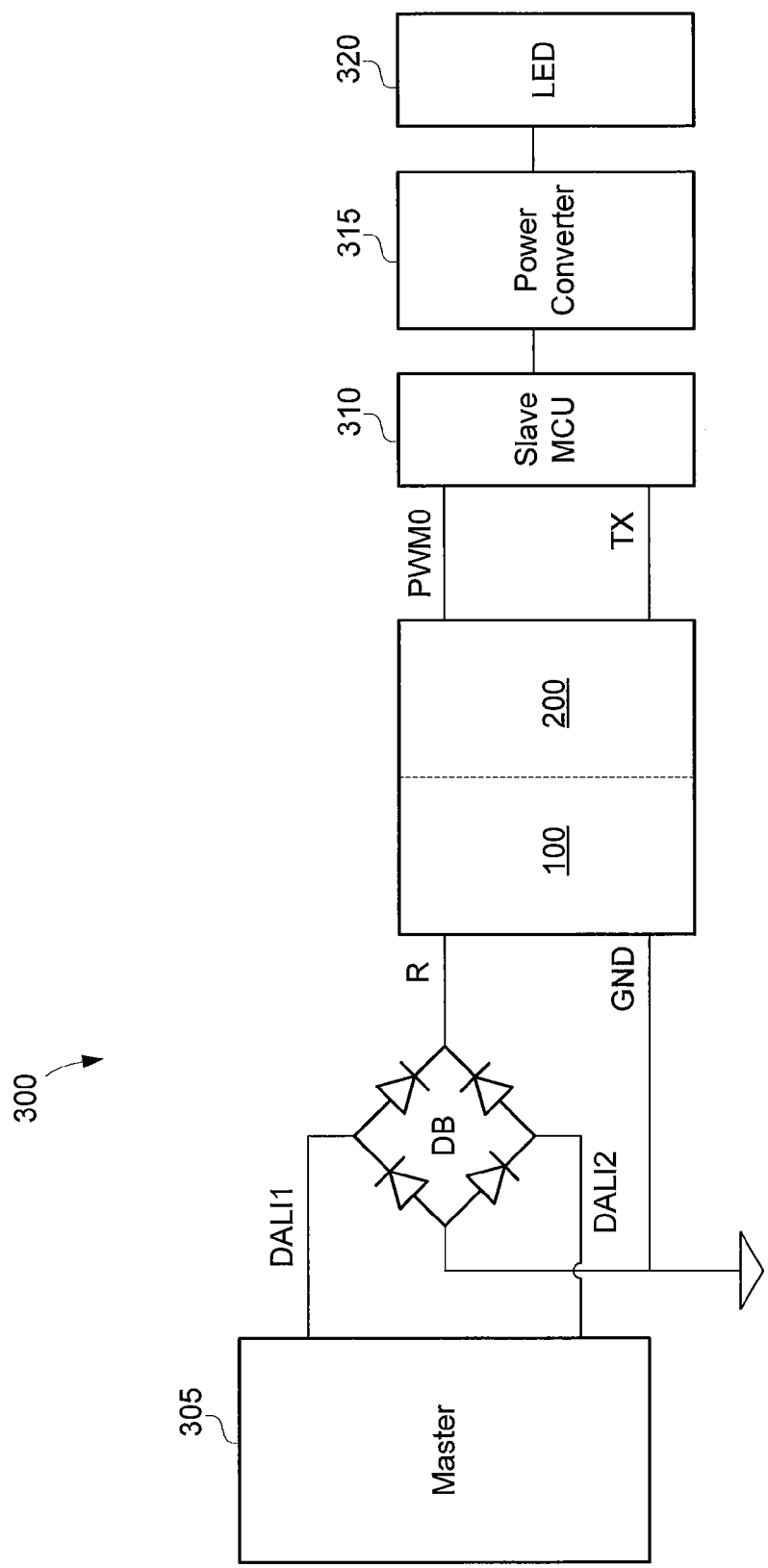
FIG. 3 is a block diagram of a master/slave DALI system including the DALI/AC interface of FIG. 1 and FIG. 2 in accordance with an aspect of the disclosure.

An example master/slave DALI system 300 is shown in FIG. 3. A master 305 controls the DALI bus 105 to drive the rail voltage on rail R as discussed for discrete portion 100. In response to the binary states for DALI bus 105, integrated circuit portion 200 drives the PWMO terminal voltage. A DALI slave device consists of a slave microcontroller (MCU) 310, a power converter 315, and an LED 320. Slave MCU 310 responds to the digital transitions in the PWMO terminal voltage to control a power converter 315 to drive an LED 320 accordingly. For example, power converter 315 may control a current for LED 320. Should the digital transitions in the PWMO terminal voltage indicate that a dimming (or brightening) is being commanded by master 305, slave MCU 310 controls power converter 315 to dim (or brighten) a light output from LED 320.

To report conditions for LED 320, slave MCU 310 drives a transmitter (TX) voltage on a TX terminal of integrated circuit portion 200. Referring again to FIG. 2, digital isolator 205 includes a signal generator 215 that responds to digital transitions of the TX terminal voltage to transmit a corresponding digital signal through its galvanic isolation barrier 235 to a receive (RX) terminal. For example, signal generator 215 can drive an isolation component 240 that couples between the TX and RX terminals. Signal generator 215 may be an oscillator or a pulse generator as discussed for signal generator 210. Similarly, isolation component 240 may comprise one or more capacitors for a capacitive coupling embodiment or one or more transformers for a magnetic coupling embodiment. A receiver 225 demodulates the signal from transmitter 215 to drive a voltage of the receive terminal RX accordingly. The receive terminal RX couples to a gate of an enhancement-mode NMOS transistor Ml that has its source tied to ground and a drain tied to the DALI terminal. The default state of the DALI terminal is the high voltage (e.g., 11 V). The slave device may thus signal to the master that it wishes to drive DALI bus 105 by pulling the DALI terminal towards ground by causing the RX terminal voltage to be asserted to switch on transistor Ml. This low state for the DALI terminal then couples through the diode bridge DB so that DALI bus 105 is driven accordingly. Digital isolator 205 includes a VCC2 terminal for receiving a supply voltage VDD as well as a second ground terminal (GND2) for the powering of signal generator 215.

To provide the VCC1 power supply voltage to digital isolator 205, the DALI terminal voltage may be filtered through a diode D1 in series with a resistor R2 to drive the VCC terminal of integrated circuit portion 200. A capacitor C2 in discrete portion 100 that couples between the VCC terminal and ground functions to store and smooth the VCC power supply voltage. In integrated circuit portion 200, an LDO 211 converts the unregulated VCC power supply voltage into the regulated VCC1 power supply voltage for digital isolator 205.

Those of some skill in this art will by now appreciate that many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A DALI circuit, comprising:
a diode bridge configured to couple an interface to a voltage rail, wherein the interface is selected from the group consisting of a DALI bus and an AC mains;
a depletion-mode FET (DFET) having a drain coupled to the voltage rail;
a first Zener diode coupled between the voltage rail and ground, wherein a first terminal of the first Zener diode is also connected to a gate of the DFET; and
a digital isolator configured to couple a source of the DFET across a galvanic isolation barrier to an output terminal.

2. The DALI circuit of claim 1, wherein the interface is the DALI bus.

3. The DALI circuit of claim 2, further comprising a capacitor arranged in parallel with the first Zener diode.

4. The DALI circuit of claim 2, wherein the digital isolator includes an input terminal, the DALI circuit further comprising:
a second Zener diode coupled between a second terminal of the first Zener diode and the input terminal, and wherein the digital isolator further includes:
an output terminal;
an isolation component;
a receiver coupled between the isolation component and the output terminal; and
a first signal generator coupled between the input terminal and the isolation component.

5. The DALI circuit of claim 3, wherein the digital isolator further includes:
a transmitter terminal; and
a receiver terminal, and wherein the DALI circuit further comprises:
an NMOS transistor coupled between the source of the DFET and ground, the NMOS transistor having a gate connected to the receiver terminal.

6. The DALI circuit of claim 3, further comprising:
a serial combination of a diode and a resistor, the serial combination being connected between the source of the DFET and a power supply node; and
a power converter coupled between the power supply node and a power supply terminal of the digital isolator.

7. The DALI circuit of claim 6, further comprising:
a storage capacitor connected between the power supply node and ground.

8. The DALI circuit of claim 6, wherein the power converter is a linear dropout (LDO) regulator.

9. The DALI circuit of claim 1, wherein the interface is the AC mains.

10. The DALI circuit of claim 1, further comprising:
a resistor coupled between the voltage rail and the gate of the DFET.

11. A method of DALI signaling, comprising:
responsive to a first binary transition of a voltage state of a DALI bus, switching a depletion-mode FET (DFET) to produce a binary transition of a first terminal voltage;
transmitting a first digital signal across a galvanic isolation barrier in a digital isolator responsive to the binary transition in the first terminal voltage to produce a binary transition of a second terminal voltage; and
controlling an LED responsive to the binary transition of the second terminal voltage.

12. The method of claim 11, wherein transmitting the first digital signal comprises transmitting the first digital signal across a capacitor or a transformer.

13. The method of claim 11, wherein the switching of the DFET comprises switching off the DFET responsive to a high-voltage state of the DALI bus.

14. The method of claim 11, wherein the switching of the DFET comprises switching on the DFET responsive to a low-voltage state of the DALI bus.

15. The method of claim 11, further comprising:
from a slave device for controlling the LED, asserting a transmitter voltage of the digital isolator;
transmitting a second digital signal across the galvanic isolation barrier of the digital isolator responsive to the assertion of the transmitter voltage to assert a receiver terminal voltage of the digital isolator; and
switching on a transistor to cause a second binary transition of the voltage state of the DALI bus responsive to the assertion of the receiver terminal voltage.

16. A DALI system; comprising:
a DALI bus;
a DALI master configured to drive the DALI bus;
a voltage rail;
a diode bridge configured to rectify a voltage of the DALI bus to produce a rail voltage on the voltage rail;
a digital isolator having an input terminal and an output terminal;

a depletion-mode FET (DFET) coupled between the voltage rail and the input terminal; and a slave lighting device connected to the output terminal.

17. The DALI system of claim 16, wherein the slave lighting device includes an LED.

18. The DALI system of claim 17, wherein the slave lighting device further comprises:

a microcontroller configured to respond to a voltage of the output terminal to control a lighting state for the LED.

19. The DALI system of claim 18, wherein the digital isolator includes a capacitor coupled between the input terminal and the output terminal.

20. The DALI system of claim 18, further comprising:

a Zener diode connected between a gate of the DFET and ground; and a resistor connected between the voltage rail and the gate of the DFET.

* * * * *